US010972761B2

United States Patent
Ra et al.

(10) Patent No.: US 10,972,761 B2
(45) Date of Patent: Apr. 6, 2021

(54) MINIMIZING STALL DURATION TAIL PROBABILITY IN OVER-THE-TOP STREAMING SYSTEMS

(71) Applicants: AT&T Intellectual Property I, L.P., Atlanta, GA (US); Purdue Research Foundation, West Lafayette, IN (US)

(72) Inventors: Moo-Ryong Ra, Basking Ridge, NJ (US); Abubakr O. Al-Abbasi, West Lafayette, IN (US); Vaneet Aggarwal, West Lafayette, IN (US)

(73) Assignees: PURDUE RESEARCH FOUNDATION, West Lafayette, IN (US); AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

(21) Appl. No.: 16/233,075

(22) Filed: Dec. 26, 2018

(65) Prior Publication Data
US 2020/0213627 A1 Jul. 2, 2020

(51) Int. Cl.
*H04N 21/2183* (2011.01)
*H04N 21/845* (2011.01)
*H04L 29/06* (2006.01)

(52) U.S. Cl.
CPC ..... *H04N 21/2183* (2013.01); *H04L 65/4084* (2013.01); *H04L 65/605* (2013.01); *H04L 65/80* (2013.01); *H04N 21/8456* (2013.01)

(58) Field of Classification Search
None
See application file for complete search history.

(56) References Cited

U.S. PATENT DOCUMENTS 6,763,523 B1 * 7/2004 Sacilotto, Jr. ........ G11B 27/034
707/999.202
6,807,550 B1 * 10/2004 Li ........................ G06F 16/10
707/796

(Continued)

FOREIGN PATENT DOCUMENTS

WO 2001057673 A1 8/2001
WO 2010060106 A1 5/2010

(Continued)

OTHER PUBLICATIONS

Alabbasi, Abubakr, et al. "FastTrack: Minimizing Stalls for CDN-based Over-the-top Video Streaming Systems." arXiv preprint arXiv:1807.01147 (2018). https://arxiv.org/pdf/1807.01147.pdf.

(Continued)

*Primary Examiner* — An Son P Huynh

(57) ABSTRACT

A method executed by a processing system of an edge router deployed in a content distribution network includes receiving a request from an endpoint device for a first file, determining that a portion of the first file is not stored in a cache of the edge router, determining that the cache is at a capacity threshold, selecting a second file to evict from the cache, wherein the second file is one of a plurality of files stored in the cache, wherein each file of the plurality of files is scheduled to be evicted from the cache when a threshold period of time has passed since a last request for the each file was received by the edge router, and wherein the threshold period of time associated with the second file is scheduled to expire soonest among all of the plurality of files, and evicting the second file from the cache.

19 Claims, 3 Drawing Sheets

(56) References Cited

U.S. PATENT DOCUMENTS

| | | | |
|---|---|---|---|
| 6,993,787 B1* | 1/2006 | Kamel | H04N 21/4325 348/E5.002 |
| 7,278,153 B1* | 10/2007 | Sanders | H04N 7/17336 348/E7.073 |
| 7,404,201 B2* | 7/2008 | Takeuchi | H04N 7/17336 725/109 |
| 7,962,011 B2 | 6/2011 | Plourde, Jr. et al. | |
| 8,010,985 B2 | 8/2011 | McKinley et al. | |
| 8,041,897 B2 | 10/2011 | Biles et al. | |
| 8,214,338 B1* | 7/2012 | Kirchhoff | G06F 16/113 707/693 |
| 8,483,208 B1* | 7/2013 | Kretchmer | H04L 29/06027 370/352 |
| 8,489,760 B2 | 7/2013 | Visharam et al. | |
| 8,782,143 B2 | 7/2014 | McCullough | |
| 8,804,767 B2* | 8/2014 | Hasek | H04N 7/17318 370/485 |
| 8,832,758 B2* | 9/2014 | Cook | H04N 7/17336 725/114 |
| 9,189,408 B1 | 11/2015 | Douglis et al. | |
| 9,247,209 B2* | 1/2016 | Phillips | G06Q 30/02 |
| 9,247,313 B1* | 1/2016 | Lewis | H04N 21/812 |
| 9,380,091 B2 | 6/2016 | Bao et al. | |
| 9,436,596 B2 | 9/2016 | Sengupta et al. | |
| 9,503,491 B2 | 11/2016 | Hurst et al. | |
| 9,538,232 B2* | 1/2017 | Carney | H04N 21/4331 |
| 9,756,142 B2 | 9/2017 | Dey et al. | |
| 9,794,604 B2* | 10/2017 | Ohno | H04N 21/2402 |
| 10,165,331 B2* | 12/2018 | Lo | H04N 21/23116 |
| 2002/0078174 A1* | 6/2002 | Sim | H04L 47/125 709/219 |
| 2002/0174430 A1* | 11/2002 | Ellis | G11B 27/34 725/46 |
| 2003/0174648 A1* | 9/2003 | Wang | H04L 65/1013 370/235 |
| 2003/0204856 A1* | 10/2003 | Buxton | H04N 7/17318 725/120 |
| 2003/0236961 A1 | 12/2003 | Qiu et al. | |
| 2004/0103120 A1* | 5/2004 | Fickle | G06Q 10/10 |
| 2005/0086386 A1 | 4/2005 | Shen et al. | |
| 2005/0256845 A1* | 11/2005 | Jen | G06F 16/40 |
| 2006/0059172 A1* | 3/2006 | Devarakonda | G06F 16/10 |
| 2006/0106852 A1* | 5/2006 | Siddall | G06F 16/1737 |
| 2007/0094471 A1* | 4/2007 | Shaath | G06F 12/1466 711/163 |
| 2007/0157281 A1* | 7/2007 | Ellis | H04N 7/17309 725/134 |
| 2007/0236599 A1* | 10/2007 | van Beek | H04N 7/163 348/419.1 |
| 2008/0031589 A1* | 2/2008 | Ariyoshi | H04N 7/17318 386/213 |
| 2008/0109911 A1* | 5/2008 | Tedesco | G06F 21/10 726/30 |
| 2008/0155613 A1* | 6/2008 | Benya | H04N 7/17318 725/89 |
| 2009/0119469 A1* | 5/2009 | Dellantoni | G06F 21/10 711/166 |
| 2009/0177699 A1* | 7/2009 | Rosenblatt | G06F 16/24562 |
| 2009/0178093 A1* | 7/2009 | Mitsuji | H04N 7/1675 725/104 |
| 2009/0290856 A1* | 11/2009 | McCarthy | H04N 19/103 386/326 |
| 2010/0058405 A1* | 3/2010 | Ramakrishnan | H04N 7/17318 725/97 |
| 2010/0094969 A1* | 4/2010 | Zuckerman | H04L 67/1008 709/219 |
| 2010/0235528 A1* | 9/2010 | Bocharov | H04N 21/6437 709/231 |
| 2011/0078717 A1* | 3/2011 | Drummond | H04N 21/4586 725/14 |
| 2011/0153856 A1* | 6/2011 | Piepenbrink | H04L 47/2416 709/231 |
| 2011/0154382 A1* | 6/2011 | Chow | H04N 21/25841 725/5 |
| 2012/0137336 A1* | 5/2012 | Applegate | H04N 21/2225 725/95 |
| 2012/0159558 A1* | 6/2012 | Whyte | H04N 21/222 725/95 |
| 2012/0227112 A1* | 9/2012 | Capasso | G06Q 30/00 726/29 |
| 2013/0067186 A1* | 3/2013 | Pronovost | G06F 12/023 711/170 |
| 2013/0263194 A1* | 10/2013 | Zhang | H04N 21/2225 725/92 |
| 2013/0275391 A1* | 10/2013 | Batwara | G06F 16/125 707/689 |
| 2013/0298175 A1* | 11/2013 | Agrawal | H04N 21/222 725/93 |
| 2013/0311555 A1* | 11/2013 | Laoutaris | H04L 12/6418 709/204 |
| 2014/0025837 A1* | 1/2014 | Swenson | H04N 21/23439 709/231 |
| 2014/0123028 A1* | 5/2014 | Kamity | H04N 21/2743 715/753 |
| 2014/0229608 A1* | 8/2014 | Bauer | H04L 41/142 709/224 |
| 2014/0317244 A1* | 10/2014 | Pantos | H04L 65/1083 709/219 |
| 2014/0344392 A1 | 11/2014 | Ozawa | |
| 2015/0003814 A1* | 1/2015 | Miller | H04N 21/4583 386/297 |
| 2015/0180924 A1* | 6/2015 | O'Callaghan | H04L 65/605 709/219 |
| 2015/0227624 A1* | 8/2015 | Busch | G06F 16/90339 707/728 |
| 2015/0347415 A1* | 12/2015 | Pantos | H04N 21/26258 709/219 |
| 2015/0381598 A1* | 12/2015 | Koved | H04L 63/08 726/3 |
| 2016/0014179 A1 | 1/2016 | Straub et al. | |
| 2016/0227258 A1* | 8/2016 | Zhang | H04L 65/605 |
| 2016/0269688 A1* | 9/2016 | Gardner | H04N 21/23116 |
| 2017/0149860 A1 | 5/2017 | Eli et al. | |
| 2017/0279913 A1* | 9/2017 | Kim | G06F 21/00 |
| 2017/0311011 A1* | 10/2017 | Jana | H04N 21/234309 |
| 2017/0357453 A1* | 12/2017 | Ko | G06F 3/0608 |
| 2019/0098067 A1* | 3/2019 | Sandoval | H04L 65/80 |
| 2019/0191221 A1* | 6/2019 | Patel | H04N 21/2747 |

FOREIGN PATENT DOCUMENTS

| | | |
|---|---|---|
| WO | 2017097368 A1 | 6/2017 |
| WO | 2018049563 A1 | 3/2018 |

OTHER PUBLICATIONS

Xie, Xiufeng, et al. "pistream: Physical layer informed adaptive video streaming over lte." Proceedings of the 21st Annual International Conference on Mobile Computing and Networking, ACM, 2015. http://xiufeng.ece.wisc.edu/papers/XXie_MobiCom15_piStream.pdf.

Ozfatura, Emre, Ozgur Ercetin, and Hazer Inaltekin. "Optimal Network-Assisted Multiuser DASH Video Streaming." IEEE Transactions on Broadcasting (2018). https://arxiv.org/pdf/1703.03214.pdf.

* cited by examiner

MINIMIZING STALL DURATION TAIL PROBABILITY IN OVER-THE-TOP STREAMING SYSTEMS

The present disclosure relates generally to network-based media content access, and more particularly to devices, non-transitory computer-readable media, and methods for minimizing stall duration tail probability (SDTP) in content distribution network (CDN)-based over-the-top (OTT) streaming systems.

BACKGROUND

Over-the-top (OTT) streaming systems distribute multimedia content directly to users over the Internet, e.g., without the aid of platforms that have traditionally been used to distribute multimedia content (e.g., broadcast television, telecommunications, and the like). For instance, a video on demand (VOD) service provider may stream video content (e.g., movies, television shows, and the like) to subscribers over the Internet. The subscribers may view the video content on smart televisions, televisions equipped with digital media players, personal computers, mobile devices, gaming consoles, and other devices that are capable of connecting to the Internet.

SUMMARY

Systems, computer-readable media, and methods are disclosed for minimizing stall duration tail probability (SDTP) in content distribution network (CDN)-based over-the-top (OTT) streaming systems. In one example, a method executed by a processing system of an edge router deployed in a content distribution network includes receiving a request from a user endpoint device for a first multimedia chunk file, determining that a portion of the first multimedia chunk file is not stored in a cache of the edge router, determining that the cache is at a capacity threshold (e.g., full), selecting a second multimedia chunk file to evict from the cache, wherein the second multimedia chunk file is one of a plurality of multimedia chunk files stored in the cache, wherein each multimedia chunk file of the plurality of multimedia chunk files is scheduled to be evicted from the cache when a threshold period of time has passed since a last request for the each multimedia chunk file was received by the edge router, and wherein the threshold period of time associated with the second multimedia chunk file is scheduled to expire soonest among all of the plurality of multimedia chunk files, and evicting the second multimedia chunk file from the cache.

In another example, a non-transitory computer-readable medium stores instructions which, when executed by a processing system of an edge router deployed in a content distribution network, cause the processing system to perform operations. The operations include receiving a request from a user endpoint device for a first multimedia chunk file, determining that a portion of the first multimedia chunk file is not stored in a cache of the edge router, determining that the cache is at a capacity threshold (e.g., full), selecting a second multimedia chunk file to evict from the cache, wherein the second multimedia chunk file is one of a plurality of multimedia chunk files stored in the cache, wherein each multimedia chunk file of the plurality of multimedia chunk files is scheduled to be evicted from the cache when a threshold period of time has passed since a last request for the each multimedia chunk file was received by the edge router, and wherein the threshold period of time associated with the second multimedia chunk file is scheduled to expire soonest among all of the plurality of multimedia chunk files, and evicting the second multimedia chunk file from the cache.

In another example, an edge router deployed in a content distribution network includes a processing system and a computer-readable medium storing instructions which, when executed by the processing system, cause the processing system to perform operations. The operations include receiving a request from a user endpoint device for a first multimedia chunk file, determining that a portion of the first multimedia chunk file is not stored in a cache of the edge router, determining that the cache is at a capacity threshold (e.g., full), selecting a second multimedia chunk file to evict from the cache, wherein the second multimedia chunk file is one of a plurality of multimedia chunk files stored in the cache, wherein each multimedia chunk file of the plurality of multimedia chunk files is scheduled to be evicted from the cache when a threshold period of time has passed since a last request for the each multimedia chunk file was received by the edge router, and wherein the threshold period of time associated with the second multimedia chunk file is scheduled to expire soonest among all of the plurality of multimedia chunk files, and evicting the second multimedia chunk file from the cache.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
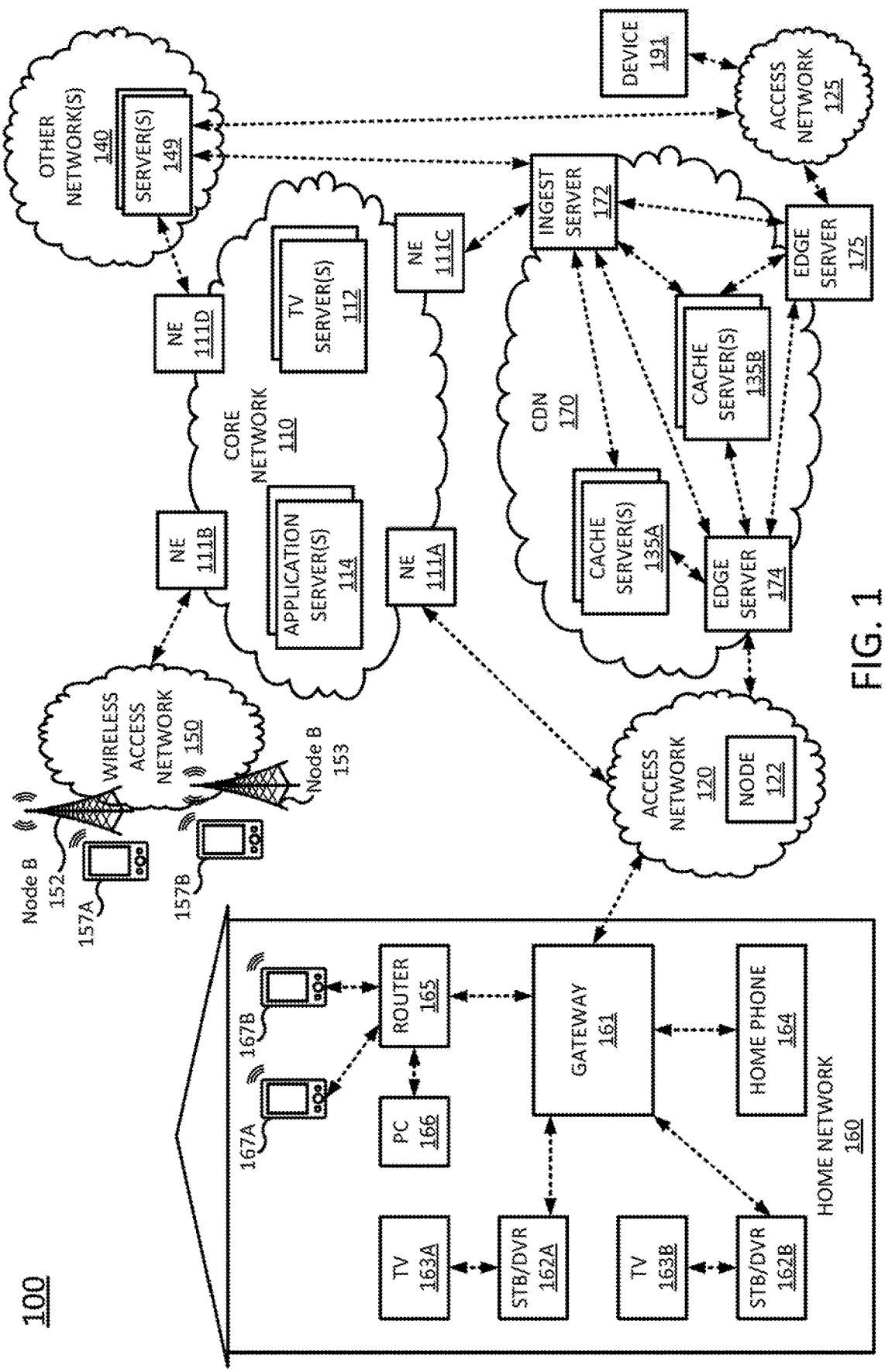
FIG. 1 illustrates an example network related to the present disclosure.

In one example, the present disclosure describes a method, computer-readable medium, and device for minimizing stall duration tail probability (SDTP) in content distribution network (CDN)-based over-the-top (OTT) streaming systems. As discussed above, over-the-top (OTT) streaming systems distribute multimedia content directly to users over the Internet, e.g., without the aid of platforms that have traditionally been used to distribute multimedia content (like broadcast television, telecommunications, and the like). It is estimated that more than fifty percent of OTT traffic is currently being delivered through CDNs, e.g., geographically distributed networks of cache servers that temporarily store portions of multimedia content and data centers that store the multimedia content in its entirety.

Some CDNs have begun to employ a multi-tiered caching approach in which last-hop network-based devices such as edge routers may also cache chunks of the multimedia content (e.g., the last-hop network devices become the lowest tier of the multi-tiered caching system). In this case, when a first user requests an item of multimedia content, a streaming service provider may first try to satisfy the request using data cached at the edge routers. If the content is cached at the edge routers, then the first user may access the content directly from the edge routers. In addition, if the content is also being delivered to a second user connected to the same edge router, then the portion of the content already received by the edge router may be sent to the first user, with the remainder of the content being delivered to the first user as the content is received (e.g., similar to a multicast streaming arrangement).

If, however, the first user's request cannot be fully served using content cached at the edge routers (e.g., some chunks of the multimedia content are stored only in other tiers), then the service provider may try to serve the rest of the request using data cached at the cache servers. If the cache servers still do not have the rest of the requested content, then the cache servers may retrieve the rest of the requested content from the data center (origin server). This two-tiered caching approach provides users with lower response times and higher bandwidth, while distributing loads across multiple edge locations. However, it has been shown that in some modern cloud applications, long tail latency may still negatively impact the user experience.

While average latency may be defined as the average amount of time taken to complete an action (e.g., download of a video chunk) and may thus be fairly predictable, tail latency may be defined as a random deviation from the average latency. For instance, some studies have shown $99.9^{th}$ percentile response times that are orders of magnitude worse than the mean response times. When streaming multimedia content which may be transmitted in multiple pieces (or chunks), long tail latency on one piece may delay playback of the entire item of multimedia content. This delay in playback may be referred to as a stall, and the duration of the stall may depend on the extent of the tail latency experienced by a piece of an item of multimedia content.

Examples of the present disclosure estimate the stall duration tail probability (SDTP), or the likelihood of a user experiencing worse than expected stall duration while streaming an item of multimedia content through a CDN employing a multi-tiered caching approach. In other words, SDTP measures the probability of the stall duration experienced by the user exceeding a predefined threshold. Further examples of the present disclosure provide a probabilistic scheduling approach that models each cache server in the CDN and each content stream as separate queues, which in turn allows the distributions of different pieces of content's download and playback times to be characterized.

Within the context of the present disclosure, a "multimedia chunk file" refers to a file that contains multimedia content. A multimedia chunk file could contain the entirety of an item of multimedia content, if the duration of that item is relatively short. Alternatively, an item of multimedia content could be split into multiple multimedia chunk files, and the multiple multimedia chunk files could be stored in a distributed manner, e.g., on a plurality of different servers (and in a plurality of different tiers of a multi-tier caching system). How the different multimedia chunk files are scheduled may further affect stalls, and, consequently, user quality of experience.

To better understand the present disclosure, FIG. 1 illustrates an example network 100, related to the present disclosure. As shown in FIG. 1, the network 100 connects mobile devices 157A, 157B, 167A and 167B, home network devices such as home gateway 161, set-top boxes (STBs) 162A and 162B, television (TV) 163A and TV 163B, home phone 164, router 165, and personal computer (PC) 166, other devices, such as device 191, and so forth, with one another and with various other devices via a core network 110, a wireless access network 150 (e.g., a cellular network), an access network 120, an access network 125, other networks 140, content distribution network (CDN) 170, and/or the Internet in general. For instance, connections between core network 110, access network 120, access network 125, home network 160, CDN 170, wireless access network 150 and other networks 140 may comprise the Internet in general, internal links under the control of a single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as core network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, a wearable smart device (e.g., a smart watch or fitness tracker), a gaming device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, access network 125, content distribution network (CDN) 170, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VoD) server(s), as described in greater detail below.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

As illustrated in FIG. 1, core network 110 may include various application servers 114. For instance, application servers 114 may be implemented to provide certain functions or features, e.g., a Serving—Call Session Control Function (S-CSCF), a Proxy—Call Session Control Function (P-CSCF), or an Interrogating—Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like.

In one example, application servers 114 may monitor links between devices in the network (e.g., links between TV servers 112 and cache servers of the CDN 170, links between cache servers and edge servers of the CDN, etc.) and may calculate stall duration tail probabilities (SDTPs) for different combinations of the links. For instance, at least one of application servers 114 may comprise all or a portion of a computing device or system, such as computing system 400, and/or processing system 402 as described in connection with FIG. 4 below, specifically configured to perform various steps, functions, and/or operations for computing SDTP, as described herein. It should be noted that the foregoing are only several examples of the types of relevant application servers 114 that may be included in core network 110.

Figure 4:
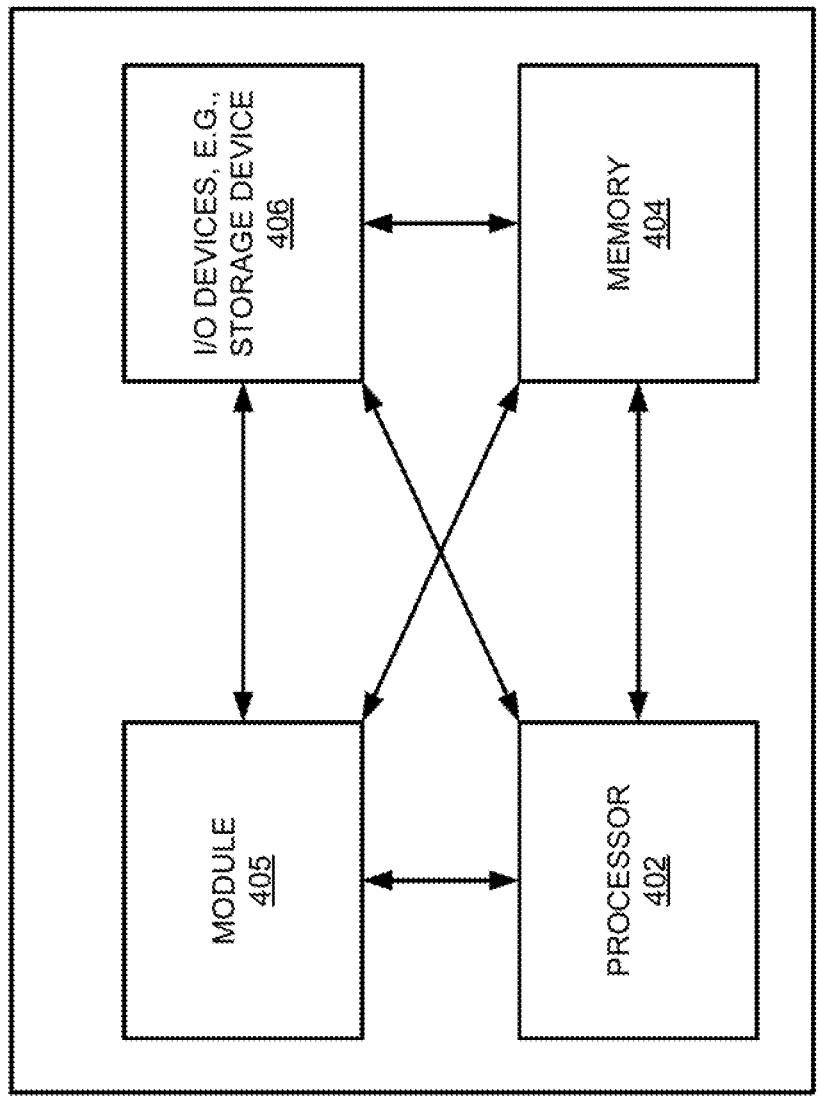
FIG. 4 illustrates a high level block diagram of a computing device specifically programmed to perform the steps, functions, blocks and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, home network 160 may include a home gateway 161, which receives data/communications associated with different types of media, e.g., television, phone, and Internet, and separates these communications for the appropriate devices. The data/communications may be received via access network 120, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

Among other functions, STB/DVR 162A and STB/DVR 162B may comprise video players capable of playing video programs in formats such as Moving Picture Expert Group (MPEG) .mpeg files, .mov files, .mp4 files, .3gp files, .f4f files, .m3u8 files, or the like. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices. It should be noted that other devices, such as one or more of mobile devices 157A, 157B, 167A and 167B, and/or PC 166 may also comprise video players and/or audio players capable of playing video and/or audio programs in various formats.

In accordance with the present disclosure, other networks 140 and servers 149 may comprise networks and devices of various content providers, e.g., of video and/or audio programming, images, documents, and so forth. In addition, in one example, access network 125 may be the same as or similar to access network 120, e.g., a Digital Subscriber Line (DSL) network, a broadband cable access network, a Local Area Network (LAN), a cellular or wireless access network, a 3$^{rd}$ party network, and the like. For instance, access network 125 may transmit and receive communications between device 191 and core network 110 relating to voice telephone calls, communications with web servers via other networks 140, content distribution network (CDN) 170 and/or the Internet in general, and so forth. Device 191 may represent a smart TV, a set-top-box (STB) and/or a digital video recorder (DVR), a PC, a laptop computer, a mobile device such as a smartphone or a computing tablet, and so forth. In various examples, access network 125 may be operated by a same or a different entity from core network 110, e.g., an Internet service provider (ISP) network. In addition, access network 125 may be operated by a same or a different entity from access network 120.

Network 100 may also include a content distribution network (CDN) 170, such as a virtualized content distribution network (vCDN). A vCDN, for instance, might be used to provide services including VOD, live linear streaming (or OTT streaming), firmware over the air (FOTA) updates, and the like.

In one example, CDN 170 may be operated by a different entity from core network 110. In another example, CDN 170 may be operated by a same entity as core network 110, e.g., a telecommunication service provider. In one example, the CDN 170 may comprise a collection of cache servers distributed across a large geographical area and organized in a tier structure. The first tier may comprise a group of servers that access content web servers (origin servers, such as TV servers 112) to pull content into the CDN 170, referred to as an ingestion servers, e.g., ingest server 172. The content may include video programs, audio programs, content of various webpages, electronic documents, video games, etc. Although a single dashed line is illustrated to represent a connection between the ingest server 172 and the NE 111C of the core network 110, it will be appreciated that the single dashed line may represent a plurality of streams into which the bandwidth between the core network 110 and the ingest server 172 may be divided.

A next tier may comprise cache servers, e.g., cache servers 135A and 135B, which temporarily store portions of the content pulled by the ingestion servers (e.g., segments of video content, where each segment may be between x and y seconds in duration). The cache servers may be geographically distributed throughout the CDN 170 and located close to the edge of the CDN to provide lower access latency for users.

A last tier may comprise edge caches, or edge servers, e.g., edge servers 174 and 175, which deliver content to end users. In particular, the edge servers 174 and 175 may store recently accessed portions of content. In addition, when requested content is not stored in the edge servers 174 and 175, stored content may be evicted from at least one of the edge servers 174 and 175 to make room for the requested content. In one example, content is evicted from the edge servers 174 and 175 according to a least recently used (LRU) policy, e.g., where the content that was least recently used is the first content to be evicted.

However, in other examples, the edge servers 174 and 175 may evict content according to a policy that considers the weight, placement, and/or access rates of the content. For instance, in one example, a file may be evicted from an edge server if the file has not been accessed within some threshold period of time since the last time the file was requested from the edge server. The threshold period of time is configurable and can be optimized based on file preference and/or the placement of the file in the CDN cache.

Figure 2:
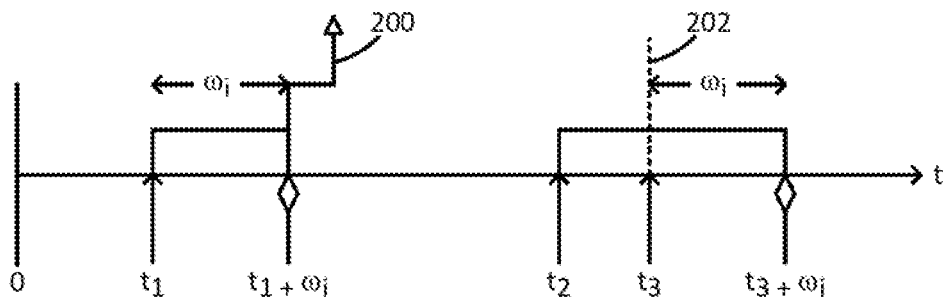
FIG. 2 illustrates an example timeline for edge caching that may be implemented in accordance with examples of the present disclosure.

FIG. 2, for instance, illustrates an example timeline for edge caching that may be implemented in accordance with examples of the present disclosure. As shown in FIG. 2, a file, i, may be requested at three separate times: $t_1$, $t_2$, and $t_3$. At the time $t_1$ of the first request, the file enters the cache at the edge server. If the file is not requested within a threshold period of time $w_i$ after entering the cache, the file is evicted (at time $t_1+w_i$) as shown by the arrow 200. At the time $t_2$ of the second request, the file enters the cache for the second time. Since the time $t_3$ of the third request is within the threshold period of time $w_i$ after the file enters the cache for the second time, the third request can be served from the cache of the edge server without involving a higher tier of the caching system (e.g., a cache server or origin server). The third request also resets the threshold period of time (as shown by dashed line 202), so that the file is not evicted before time $t_3+w_i$.

Referring back to FIG. 1, edge servers 174 and 175 may also help with multicasting content to multiple users connected to the same edge server. For instance, if a first user requests an item of multimedia content, an edge server may cache a portion of the item and begin serving the item to the first user via a first unicast link. When a second user requests the same item of multimedia content from the edge server, the edge server may begin serving the cached portions of the item to the second user via a second unicast link.

For ease of illustration, a single ingest server 172, two sets of cache servers 135A and 135B, and two edge servers 174 and 175 are shown in FIG. 1. Although single dashed lines are illustrated to show connections between the core network and the CDN, and between the servers of the CDN, the bandwidth between the core network 110 and the ingest server 172 may be split into a plurality of parallel streams. In addition, the bandwidth between the ingest server 172 and the cache servers 135A and 135B, and the bandwidth between the cache servers 135A and 135B and the edge server 174, may also be divided into a plurality of parallel streams. Multiple parallel streams allows multiple content downloads to be accommodated simultaneously. Moreover, the ability to obtain multiple items of content simultaneously may minimize (broadly reduce) stall durations.

Furthermore, in one example, any or all of the cache servers 135A and 135B and edge servers 174 and 175 may be multi-tenant, serving multiple content providers, such as core network 110, content providers associated with server(s) 149 in other network(s) 140, and so forth. In addition, in one example, any or all of ingest server 172, cache servers 135A, cache servers 135B, edge server 174, and/or edge sever 175 may be implemented as a virtual machine (VM) backed by multiple directly attached SSDs.

As discussed in further detail below the operator of the CDN 170 may configure the links between the ingest server 172, the cache servers 135A and 135B, and the edge servers 174 and 175 to improve the user experience.

Various devices may be involved in the distribution and tracking of access to various media content. For instance, other networks 140 and servers 149 may comprise networks and devices of various content providers, e.g., of video and/or audio programming, images, documents, and so forth. In one example, media content, e.g., video content, from servers 149 may be provided to TV servers 112 in core network 110, e.g., for television broadcast, VoD streaming, IPTV streaming, cellular streaming or cellular download, and so forth. For example, as discussed above, television servers 112 may include content server(s) to store scheduled television broadcast content for a number of television channels, video-on-demand (VoD) programming, live linear streaming content, local programming content, and so forth. In addition, television servers 112 may include a broadcast server, a cable head-end, and so forth which may broadcast or otherwise transmit the media content, e.g., via access network 120, access network 125, and/or CDN 170, and so forth. Alternatively, or in addition, media content may be obtained by end users without the involvement of core network 110. For instance, servers 149 may comprise web servers/media caches that provide media contents to CDN 170 via ingest server 172. In turn, the media contents may be distributed to various end users, such as device 191 via access network 125, PC 166 via access network 120, home gateway 161, etc.

In accordance with the present disclosure, various devices illustrated in FIG. 1 may process and respond to requests for multimedia content by locating the content, transferring portions of the content among tiers of cache, selecting streams over which to deliver portions of the content, and so forth. As just one example, an edge server 174 may manage its cache in order to expedite deliver of content to users, e.g., by minimizing SDTP for the content. For instance, the edge server may evict certain files from cache in order to make room for new files comprising portions of recently requested content. The edge server may also minimize SDTP by selecting specific streams via which to download portions of the content from higher tiers of cache, when necessary. Alternatively, or in addition, other devices such as the application servers 114, NE 111C, ingest server 172, and/or cache servers 135A and 135B may assist with some or all of these functions. It should be noted that "minimizing" SDTP should not be interpreted to mean reducing to the lowest possible amount or degree. In the present disclosure, "minimizing" SDTP should be interpreted to mean reducing SDTP to a level in accordance with a particular requirement or implementation.

Further details regarding the functions that may be implemented by edge servers 174 and 175, cache servers 135A and 135B, ingest server 172, NEs 111-111D, TV servers 112, application servers 114, and so forth are discussed in greater detail below in connection with the examples of FIGS. 2-3. In addition, it should be noted that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 3:
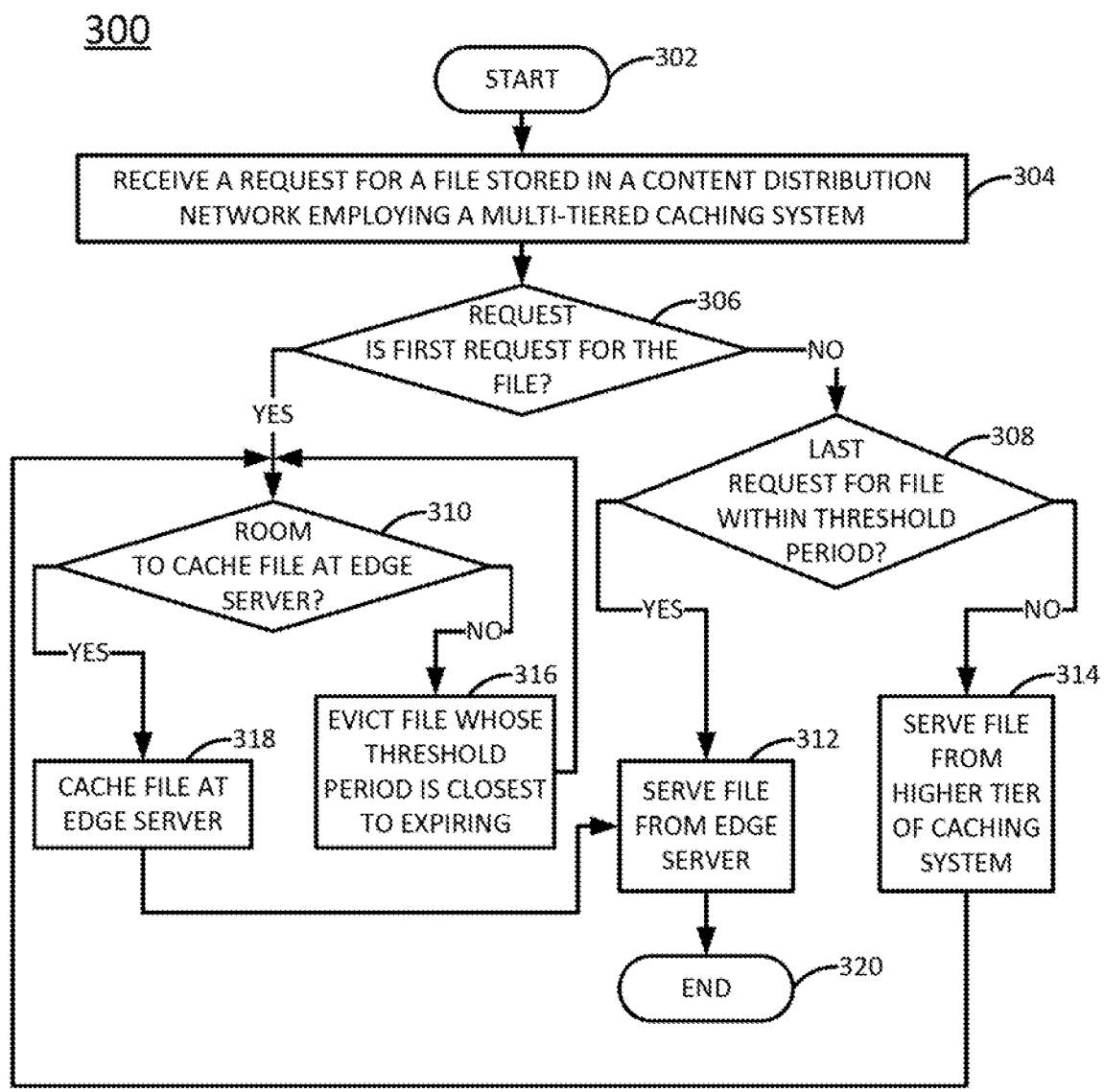
FIG. 3 illustrates a flowchart of an example method for minimizing stall duration tail probability in content distribution network-based over-the-top streaming systems, in accordance with the present disclosure.

FIG. 3 illustrates a flowchart of a method 300 for minimizing stall duration tail probability (SDTP) in content distribution network (CDN)-based over-the-top (OTT) streaming systems, in accordance with the present disclosure. In one example, the method 300 is performed by a network-based device, such as one of the edge servers 174 or 175, or any one more components thereof, such as a processing system, or by one of these devices in conjunction with other devices and/or components of network 100 of FIG. 1, e.g., other application servers 114, NEs 111A-111D, cache servers 135A and 135B, and so forth. In one example, the steps, functions, or operations of method 300 may be performed by a computing device or system 400, and/or a processing system 402 as described in connection with FIG. 4 below. For instance, the computing device 400 may represent any one or more components of a content management server and/or one or more other devices that is/are configured to perform the steps, functions and/or operations of the method 300. For illustrative purposes, the method 300 is described in greater detail below in connection with an example performed by a processing system, such as processing system 402.

The method 300 begins in step 302 and proceeds to step 304.

In step 304, the processing system may receive a request for a file stored in a content distribution network (CDN) employing a multi-tier caching system. As discussed above, the multi-tier caching system may be a caching system comprising at least two tiers of cache: a first tier implemented in cache servers and a second tier implemented in edge servers. The request may be sent from a user endpoint device that is connected to the CDN. The file that is requested may comprise an item of multimedia content (e.g., video, audio, or the like) that is stored on an origin server (e.g., a content or application server) and that may be streamed to the user endpoint device.

In step 306, the processing system may determine whether the request is the first request for the file. For instance, another user endpoint device may have previously requested the same file. In such a case, the file, or at least a portion of the file, may already be cached at an edge server of the CDN.

If the processing system concludes in step 306 that the request is not the first request for the file, then the method 300 may proceed to step 308. In step 308, the processing system may determine whether the last request (i.e., most recent request excluding the request received in step 304) for the file was received within a threshold period of time. As discussed above, the CDN may employ a caching approach in which files that have not been requested for at least a threshold period of time are automatically evicted from cache to make room for other files. Thus, if the last request for the file was received within the threshold period of time, the file is likely still stored in cache in an edge server of the CDN. If the last request for the file was not received within the threshold period of time, the file is likely no longer stored in cache in an edge server of the CDN.

If the processing system concludes in step 308 that the last request for the file was received within the threshold period of time, then the method 300 may proceed to step 312. In step 312, the processing system may serve the file from an edge server of the CDN. That is, the file may be streamed from the edge server to the user endpoint device. The method 300 may end in step 320 once the entire file (or portion of the file that is cached at the edge server) has been delivered to the user endpoint device.

Alternatively, if the processing system concludes in step 308 that the last request for the file was not received within the threshold period of time, then the method 300 may proceed to step 314. In step 314, the processing system may serve the file from a higher tier of the CDN's caching system. In one example, the higher tier may include a cache server and/or the data center/origin server. In a further example, the specific cache server and the specific stream from the cache server to the edge server may be selected to minimize the stall duration tail probability (SDTP) experienced by the user of the user endpoint device while playing back the file. If it is necessary to serve part of the file from the data center as well, then the specific stream from the data center to the cache server may also be selected to minimize the SDTP.

In one example, the SDTP may be calculated by first calculating the individual download times for each portion of the file (e.g., each chunk of a video file). The calculated download times account for retrieving the portions of the file from a cache server and/or from the data center, as necessary (e.g., the first x portions may be available from a cache server, while the last y portions may need to be downloaded from the data center). In addition, the individual play times of the portions may also be calculated (where a play time of a portion indicates a time at which playback on the user endpoint device is estimated to begin, given that the portion is downloaded over specific streams between the edge server and cache server and/or between the cache server and the data center). In one example, the play time of a portion is calculated as the greater of: (1) the time to download the portion; and (2) the time to play all previous portions of the file plus the time to play the portion.

In one example, the stall duration for a file i, delivered over a stream $\beta_j$ between the data center and a cache server j and a stream $v_j$ between the cache server j and the edge server, may be calculated as:

$$\Gamma_U^{(i,j,\beta_j,v_j)} = T_{i,j,\beta_j,v_j}^{(L_i)} - d_s - (L_i - 1)\sigma \qquad \text{(EQN. 1)}$$

where $\Gamma_U^{(i,j,\beta_j,v_j)}$ is the stall duration, $L_i$ is the number of portions of the file i to be downloaded, $T_{i,j,\beta_j,v_j}^{(L_i)}$ is the time at which the portion $L_i$ of the file i begins to play at the user endpoint device (given that the portion $L_i$ is downloaded from the streams $\beta_j$ and $v_j$ and the server j), $d_s$ is the startup delay of the playback of the file i on the user endpoint device, and $\tau$ is the amount of time (e.g., in seconds) to play all previous portions of the file i plus the time to play the portion $L_i$.

The stall duration tail probability for the file i, i.e., the probability that the stall duration $\tau_U^{(i,j,\beta_j,v_j)}$ is greater than a predefined threshold $\sigma$, may be expressed as:

$$Pr(\Gamma_{tot}^{(i)}) \leq \sigma \qquad \text{(EQN. 2)}$$

In one example, the cache server, the stream from the cache server to the edge router, and the stream from the data center to the cache server are selected so that the SDTP for the file when downloaded over the selected combination of cache server, stream from the cache server to the edge router, and stream from the data center to the cache server is less than a predefined threshold SDTP (e.g., the mean SDTP experienced by users of the CDN).

Once the file has been served from the higher tier of the CDN's caching system, the method 300 may proceed to step 310. It should also be noted that, referring back to step 306, if the processing system concludes that the request received in step 304 is the first request for the file, then the method 300 may proceed directly from step 306 to step 310 (i.e., bypassing steps 308-312).

In step 310, the processing system may determine whether there is room to cache the file at an edge server. As discussed above (e.g., in connection with FIG. 2), an edge server may cache a file (or a portion of a file) for at least a threshold period of time. Thus, it may be the case that the cache of an edge server may be full or near full (broadly at or above a capacity threshold, e.g., full, 99% full, 97% full, 95% full, 93% full, and the like), and that all files currently stored in cache at the edge server have been requested within the threshold period of time.

If the processing system concludes in step 310 that there is room to cache the file at an edge server, then the method 300 may proceed to step 318. In step 318, the processing system may cache the file at an edge server, i.e., after serving or retrieving the file from a higher tier of the CDN's caching system. The method 300 may then proceed to step 312 and proceed as described above to serve the file from the edge server.

If, however, the processing system concludes in step 310 that there is no room to cache the file at an edge server (e.g., the edge server's cache is full (broadly at or above a capacity threshold)), then the method 300 may proceed to step 316. In step 316, the processing system may evict the file whose threshold period of time will expire soonest from an edge server. As discussed above (e.g., in connection with FIG. 2), a file may remain in the cache of an edge server until a threshold period of time expires since a most recent request for the file. This threshold period of time may be the same for all files caches in the edge server. Although the threshold period of time may not have yet expired for any files cached at the edge server, the edge server may still evict a file for which the threshold period of time is closest to expiring in order to make room for the file that was requested in step 304.

After evicting a file in step 316, the method 300 may return to step 310, and the processing system may proceed as described above to verify that there is now room to cache the file at the edge server. If there is still insufficient room to cache the file, the processing system may repeat step 316 one or more times, e.g., continuing to evict files whose threshold periods of time are closest to expiring, until sufficient room is created.

Although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the method 300 may be implemented as the system 400. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for minimizing stall duration tail probability, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, transceivers, power units, and so forth. Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for minimizing stall duration tail probability (e.g., a software program comprising computer-executable instructions) can be loaded into memory 404 and executed by hardware processor element 402 to implement the steps, functions, or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for minimizing stall duration tail probability (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:
1. A method comprising:
receiving, by a processing system of an edge router deployed in a content distribution network comprising the edge router, a plurality of cache servers, a data center, a first plurality of streams connecting the data center to the plurality of cache servers, and a second plurality of streams connecting the plurality of cache servers to the edge router, a request from a first user endpoint device for a first multimedia chunk file of a plurality of multimedia chunk files collectively making up an item of multimedia content;
determining, by the processing system, that a portion of the first multimedia chunk file is not stored in a cache of the edge router;
determining, by the processing system, that the cache is at a capacity threshold;
selecting, by the processing system, a second multimedia chunk file to evict from the cache, wherein the second multimedia chunk file is one of a plurality of multimedia chunk files stored in the cache;
evicting, by the processing system, the second multimedia chunk file from the cache;
calculating, by the processing system for each combination of a plurality of combinations of one stream of the first plurality of streams, one cache server of the plurality of cache servers, and one stream of the second plurality of streams, an estimated stall duration of a playback of the first multimedia chunk file on the first user endpoint device, wherein the estimated stall duration is calculated as $T_{i,j,\beta_j,v_j}^{(L_i)} - d_s - (L_i - 1)\tau$, wherein i is the first multimedia chunk file, $L_i$ is the portion of the first multimedia chunk file, $T_{i,j,\beta_j,v_j}^{(L_i)}$ is a time at which the portion of the first multimedia chunk file begins to play at the first user endpoint device given that the portion of the first multimedia chunk file is downloaded from the each combination, $d_s$ is a startup delay of a playback of the portion of the first multimedia chunk file on the first user endpoint device, and $\tau$ is an amount of time to play all portions of the first multimedia chunk file prior to the portion of the first multimedia chunk file plus the time to play the portion of the first multimedia chunk file; and downloading, by the processing system, the portion of the first multimedia chunk file from a first combination of the plurality of combinations of one stream of the first plurality of streams, one cache server of the plurality of cache servers, and one stream of the second plurality of streams, wherein the first combination has a lowest estimated stall duration of the plurality of combinations.

2. The method of claim 1, wherein the edge router resides in a lowest tier of a multi-tier caching system of the content distribution network.

3. The method of claim 2, wherein a tier of the multi-tier caching system above the edge router comprises the plurality of cache servers, and wherein a tier of the multi-tier caching system above the tier comprising the plurality of cache servers comprises the data center storing the first multimedia chunk file in an entirety.

4. The method of claim 1, wherein the determining that the portion of the first multimedia chunk file is not stored in the cache of the edge router comprises:
determining, by the processing system, that the request is a first request for the portion of the first multimedia chunk file.

5. The method of claim 1, wherein the determining that the portion of the first multimedia chunk file is not stored in the cache of the edge router comprises:
determining, by the processing system, that the portion of the first multimedia chunk file has been requested in a previously received request; and
determining, by the processing system, that at least a threshold period of time has passed since the previously received request was received.

6. The method of claim 1, further comprising:
repeating the selecting and the evicting until there is room in the cache to store the portion of the first multimedia chunk file.

7. The method of claim 1, further comprising:
storing, by the processing system, the portion of the first multimedia chunk file in the cache; and
serving, by the processing system, the portion of the first multimedia chunk file to the first user endpoint device from the cache.

8. The method of claim 7, further comprising:
evicting, by the processing system the portion of the first multimedia chunk file from the cache when a time elapsed between the storing and a current time is at least a threshold period of time, and no subsequent request for the portion of the first multimedia chunk file has been received.

9. The method of claim 7, further comprising:
receiving, by the processing system, a request from a second user endpoint device for the first multimedia chunk file, wherein a time elapsed between the storing and the receiving of the request from the second user endpoint device is less than a threshold period of time; and
serving, by the processing system, the portion of the first multimedia chunk file to the second user endpoint device from the cache.

10. The method of claim 9, wherein the portion of the first multimedia chunk file is served to the first user endpoint device via a first unicast stream, and the portion of the first multimedia chunk file is served to the second user endpoint device via a second unicast stream separate from the first unicast stream.

11. The method of claim 1,
wherein the downloading minimizes a likelihood of the first user endpoint device experiencing a stall duration that is worse than a predefined threshold stall duration.

12. The method of claim 11, wherein the predefined threshold stall duration is a mean stall duration experienced by a plurality of user endpoint devices streaming a plurality of multimedia chunk files via the content distribution network.

13. The method of claim 1, wherein each multimedia chunk file of the plurality of multimedia chunk files stored in the cache is scheduled to be automatically evicted from the cache in response to an expiration of a threshold period of time associated with the each multimedia chunk file.

14. The method of claim 13, wherein the threshold period of time defines a period of time that has passed since a last request for the each multimedia chunk file stored in the cache was received by the edge router.

15. The method of claim 14, wherein the threshold period of time associated with the second multimedia chunk file is scheduled to expire soonest among all of the plurality of multimedia chunk files stored in the cache.

16. The method of claim 13, wherein the threshold period of time is configurable.

17. The method of claim 13, wherein the threshold period of time comprises a same period of time for all multimedia chunk files stored in the content distribution network.

18. A non-transitory computer-readable medium storing instructions which, when executed by a processing system of an edge router deployed in a content distribution network comprising the edge router, a plurality of cache servers, a data center, a first plurality of streams connecting the data center to the plurality of cache servers, and a second plurality of streams connecting the plurality of cache servers to the edge router, cause the processing system to perform operations, the operations comprising:
receiving a request from a user endpoint device for a first multimedia chunk file of a plurality of multimedia chunk files collectively making up an item of multimedia content;
determining that a portion of the first multimedia chunk file is not stored in a cache of the edge router;
determining that the cache is at a capacity threshold;
selecting a second multimedia chunk file to evict from the cache, wherein the second multimedia chunk file is one of a plurality of multimedia chunk files stored in the cache;
evicting the second multimedia chunk file from the cache;
calculating, for each combination of a plurality of combinations of one stream of the first plurality of streams, one cache server of the plurality of cache servers, and one stream of the second plurality of streams, an estimated stall duration of a playback of the first multimedia chunk file on the user endpoint device, wherein the estimated stall duration is calculated as $T_{i,j,\beta_j,v_j}^{(L_i)} - d_s - (L_i - 1)\tau$, wherein i is the first multimedia chunk file, $L_i$ is the portion of the first multimedia chunk file, $T_{i,j,\beta_j,v_j}^{(L_i)}$ is a time at which the portion of the first multimedia chunk file begins to play at the user endpoint device given that the portion of the first multimedia chunk file is downloaded from the each combination, $d_s$ is a startup delay of a playback of the portion of the first multimedia chunk file on the user endpoint device, and $\tau$ is an amount of time to play all portions of the first multimedia chunk file prior to the portion of the first multimedia chunk file plus the time to play the portion of the first multimedia chunk file; and downloading the portion of the first multimedia chunk file from a first combination of the plurality of combinations of one stream of the first plurality of streams, one cache server of the plurality of cache servers, and one stream of the second plurality of streams, wherein the first combination has a lowest estimated stall duration of the plurality of combinations.

19. An edge router deployed in a content distribution network comprising the edge router, a plurality of cache servers, a data center, a first plurality of streams connecting the data center to the plurality of cache servers, and a second plurality of streams connecting the plurality of cache servers to the edge router, comprising:

a processing system; and a computer-readable medium storing instructions which, when executed by the processing system, cause the processing system to perform operations, the operations comprising:

receiving a request from a user endpoint device for a first multimedia chunk file of a plurality of multimedia chunk files collectively making up an item of multimedia content;

determining that a portion of the first multimedia chunk file is not stored in a cache of the edge router;

determining that the cache is at a capacity threshold;

selecting a second multimedia chunk file to evict from the cache, wherein the second multimedia chunk file is one of a plurality of multimedia chunk files stored in the cache;

evicting the second multimedia chunk file from the cache;

calculating, for each combination of a plurality of combinations of one stream of the first plurality of streams, one cache server of the plurality of cache servers, and one stream of the second plurality of streams, an estimated stall duration of a playback of the first multimedia chunk file on the user endpoint device, wherein the estimated stall duration is calculated as $T_{i,j,\beta_j,v_j}^{(L_i)} - d_s - (L_i - 1)\tau$, wherein i is the first multimedia chunk file, $L_i$ is the portion of the first multimedia chunk file, $T_{i,j,\beta_j,v_j}^{(L_i)}$ is a time at which the portion of the first multimedia chunk file begins to play at the user endpoint device given that the portion of the first multimedia chunk file is downloaded from the each combination, $d_s$ is a startup delay of a playback of the portion of the first multimedia chunk file on the user endpoint device, and $\tau$ is an amount of time to play all portions of the first multimedia chunk file prior to the portion of the first multimedia chunk file plus the time to play the portion of the first multimedia chunk file; and downloading the portion of the first multimedia chunk file from a first combination of the plurality of combinations of one stream of the first plurality of streams, one cache server of the plurality of cache servers, and one stream of the second plurality of streams, wherein the first combination has a lowest estimated stall duration of the plurality of combinations.

* * * * *